United States Patent [19]

Starch

[11] Patent Number: 4,894,177

[45] Date of Patent: Jan. 16, 1990

[54] AGGLOMERATED GRANULES FOR THE DELAYED RELEASE OF ANTIFOAMING AGENTS IN LAUNDERING SYSTEMS

[75] Inventor: Michael S. Starch, Lincoln Township, Midland County, Mich.

[73] Assignee: Dow Corning Corporation, Midland, Mich.

[21] Appl. No.: 178,951

[22] Filed: Apr. 7, 1988

[51] Int. Cl.$^4$ .................... B01D 19/02; B01D 19/04; C11D 3/22; C11D 3/37

[52] U.S. Cl. .................... 252/174.15; 252/174; 252/174.17; 252/174.18; 252/321; 252/358; 23/313 R; 264/117; 428/405

[58] Field of Search ................ 252/90, 174.13, 174.15, 252/174.17, 174.18, DIG. 2, 321, 358, 174, 174.25; 428/405; 264/117; 23/313 R

[56] References Cited

U.S. PATENT DOCUMENTS

| | | | |
|---|---|---|---|
| 3,455,839 | 7/1969 | Rauner | 252/321 |
| 3,933,672 | 1/1976 | Bartolotta | 252/174.13 |
| 4,419,260 | 12/1983 | Reuter | 252/174.13 |
| 4,436,647 | 3/1984 | Pirson | 252/321 |
| 4,447,349 | 5/1984 | Tai | 252/174.13 |
| 4,451,387 | 5/1984 | Tai | 252/174.15 |
| 4,540,499 | 9/1985 | Sakatani | 252/174.17 |
| 4,599,189 | 7/1986 | Wuhrmann | 252/321 |
| 4,637,890 | 1/1987 | Carbtree et al. | 252/90 |
| 4,639,489 | 1/1987 | Aizawa et al. | 524/588 |
| 4,652,392 | 3/1987 | Baginski | 252/109 |
| 4,690,713 | 9/1987 | Terae | 106/287.16 |
| 4,806,266 | 2/1989 | Burrill | 252/174.15 |
| 4,818,292 | 4/1989 | Iley | 106/210 |

FOREIGN PATENT DOCUMENTS

| | | | |
|---|---|---|---|
| 0206522 | 5/1986 | European Pat. Off. | |
| 1849 | 7/1963 | Japan | |
| 71608 | 10/1980 | Japan | |
| 667649 | 5/1952 | United Kingdom | 252/358 |

OTHER PUBLICATIONS

Abstract for Japanese Patent No. 73126930 Article–Formulating for Controlled release with Methocel Cellulose ethers.

*Primary Examiner*—Dennis Albrecht
*Assistant Examiner*—Susan B. Franklin
*Attorney, Agent, or Firm*—Marc C. Pawl

[57] ABSTRACT

The invention relates to a delayed release laundering additive. The invention comprises a carrier comprising one or more water soluble modified cellulose materials which holds one or more antifoam and a process for the manufacture thereof. Optionally, the invention comprises a conventional laundry detergent in admixture with the antifoam agent or agents held on the carrier.

52 Claims, 1 Drawing Sheet

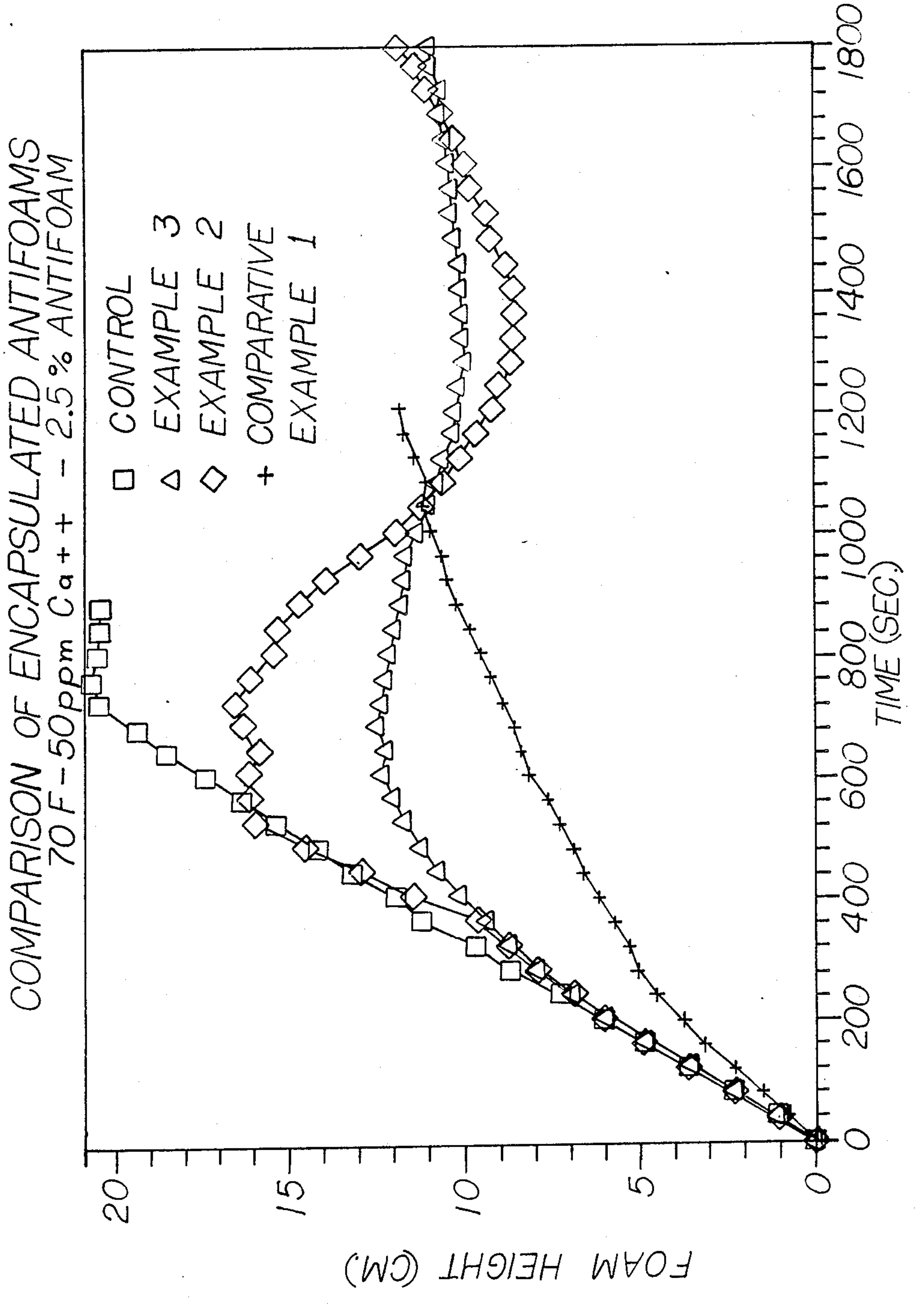
COMPARISON OF ENCAPSULATED ANTIFOAMS
70 F - 50 ppm Ca++ - 2.5% ANTIFOAM
□ CONTROL
△ EXAMPLE 3
◇ EXAMPLE 2
+ COMPARATIVE EXAMPLE 1
FOAM HEIGHT (CM.)
TIME (SEC.)
0
5
10
15
20
0
200
400
600
800
1000
1200
1400
1600
1800

AGGLOMERATED GRANULES FOR THE DELAYED RELEASE OF ANTIFOAMING AGENTS IN LAUNDERING SYSTEMS

BACKGROUND OF THE INVENTION

The invention relates to laundry additive and detergent compositions having components which are designed for time delayed release in laundering systems. More specifically, the invention is a laundry additive comprising an antifoam agent held by a carrier, wherein the carrier is soluble in laundry water and releases the antifoam agent into the laundering system, after a period of delay. The invention also contemplates the mixture of the delayed release additive of the invention and a conventional dry powdered or granular laundry detergent.

The invention developed from a need to provide a laundry detergent with an additive for controlling detergent foam or suds formation. In mechanical laundering operations it is often considered desirable to reduce the amount of detergent foam in the laundry water for several reasons. By reducing foaming and suds, the surfactant which would otherwise be suspended in the foam is returned to the laundry water where its cleaning action is most effective. Reducing the amount of foam in the laundry water also aids in rinsing the detergent from the laundered articles. Detergent is more easily and throughly removed from the laundered articles when the detergent is in solution, rather than in the form of foam. Also, controlling the amount of detergent foam reduces the possibility of foam overflowing the wash machine and flooding the adjacent laundry area.

Adding an antifoaming agent directly to the wash at the beginning of the laundry cycle would be immediately effective in suppressing the formation of detergent foam. Suppression of foam from the onset of the wash cycle is not generally viewed as a desirable condition. A person doing the wash may wrongly conclude that the lack of foam from the time of adding the detergent indicates that an insufficient amount of detergent has been added to the wash, or that the detergent lacks efficacy. It is therefore preferred to have a laundry detergent which has an initial foaming stage to indicate the detergent is working and is present in an adequate amount, but which also permits the foam to dissipate later in the wash cycle so that the above mentioned drawbacks of detergent foam can be avoided.

Detergent composition containing antifoaming agents held on carriers are known in the art. U.S. Pat. No. 4,451,387 discloses a granular detergent composition with a suds control agent held on a carrier. The suds control component comprises carrier having a gelatinized starch core with a mixture of silicone oil and hydrophobic silica adsorbed thereon. In this patent it is strongly preferred that the suds control agent be coated with a layer of wax to improve the storage characteristics of the suds control agent.

European Patent Application No. 0,206,522 discloses a particulate antifoam ingredient suitable for incorporation into a detergent powder composition. High and low temperature sensitive antifoaming agents are supported on a core comprised of gelatinized starch, sodium perborate monohydrate, zeolite cation exchanger, water soluble salts such as sodium tripolyphosphate and sodium sulphate in admixture with hydrophobic silica and/or paraffin wax, or hydrophobic silica and/or paraffin wax with gelatinized starch.

Attempts were made by the inventor to prepare antifoam laundry additives, as disclosed in U.S. Pat. No. 4,451,387 and European Patent Application No. 0,206,522 using gelatinized starch as a carrier, but without including a wax or material other than a carrier and antifoam agent. It was found that without wax the gelatinized starch carrier and antifoam combined to make a wet, sticky mass that was unsuitable for storage or practical use as intended with the invention.

A detergent composition containing an antifoaming agent which becomes active during the rinse cycle is disclosed in U.S. Pat. No. 4,637,890. The detergent composition contains a plurality of suds control prills comprising fatty acid soap, quaternary ammonium salt, and a silicone fluid suds suppressor. It is theorized in the patent that the prills dissolve in the relatively high pH (e.g. from about 9 to about 10.5 pH) wash water, but that the antifoam components of the prills do not become active until exposed to lower pH solutions, that is, the water of the rinse cycle. When the high pH wash water is removed from the wash machine, components of the prills are physically carried over with articles being laundered into the rinse water. The rinse water naturally has a lower detergent content than the wash water and consequently it has a lower pH which allows the prill components to dissociate, initiating antifoaming activity.

Japanese Patent Application No. 73,126,930 also discloses a coated laundering aid which remains intact during the high pH alkaline washing cycle but is soluble in rinse water.

A publication of The Dow Chemical Company entitled *Formulating for Controlled Release with Methocel Cellulose Ethers* discloses the use of modified cellulose ethers in medicine tablets to control and slow the release of a pharmacologically active agent over a period of time, in order to prevent the sudden "dumping" of a medication into a patient's system.

SUMMARY OF THE INVENTION

The present invention relates to a delayed release laundry additive comprising one or more antifoam agents adsorbed on a powdered water soluble carrier selected from one or more modified cellulose carriers, which is subsequently agglomerated into granular form by mixing in the presence of a solvent for the carrier. The invention further comprises as optional, a conventional dry powdered or granular laundry detergent in admixture with granules of the delayed release antifoam laundry additive. The method by which delayed release antifoam laundry additives of the invention are prepared is claimed.

DETAILED DESCRIPTION OF THE INVENTION

The invention comprises one or more antifoam agents held by a water soluble carrier for time delayed release into the laundry water of a laundering system. Optionally, the invention further includes a conventional detergent throughout which is distributed agglomerated granules of the carrier holding the agent.

Suitable antifoaming agents can be selected from the group consisting of silicon based antifoams, particularly conventional inorganic-filled polydimethyl siloxane antifoam agents, especially silica -filled polydimethyl siloxane antifoam agents as disclosed in U.S. Pat. Nos.

4,639,489 and 3,455,839, incorporated herein by reference. These and other suitable antifoam agents are commercially available under the tradenames of Silcolapse 431 and Silicone EP 6508 from ICI United States Inc., Wilmington, Delaware, Rhodosil 454 from Rhone-Poulenc Chemical Co., Monmouth Junction, New Jersey and Silkonol AK 100 commerically available from Wacker-Chemie G.m.b.H., Munich, Federal Republic of Germany.

The above list is not intended to be a comprehensive listing of all antifoam agents which can be used in the invention. Rather it is intended to be illustrative of a broad range of materials which can be incorporated into the invention as antifoam agents. Other antifoam agents not listed above can be used in the invention as long as the agents are compatible with the carrier and perform in a laundering system in the desired controlled release fashion. It is of particular importance that they have an oily consistency and not be water soluble.

The carrier of the invention is a solid particulate structure of modified cellulose which holds a quantity of the desired laundering agent or agents. It is believed that the time release aspect of the invention is due to the antifoam agent being concentrated mainly in and around the center or interior portion of the carrier particle, due to the agglomeration process by which granular particles of the carrier are formed. The inventor theorizes that in the agglomeration step by which the granules of the invention are formed, the water or other solvent for the carrier actually drives the antifoam agent toward the center of the granule being formed. The exterior portion, or crust, of the granules are thereby left relatively free of antifoam agent.

The carrier is soluble in laundry water, but dissolves at a relatively slow rate due to the swelling of the surface of the particle in contact with the laundry water. Because the exterior portion of the granules is relatively free of antifoam agent, no antifoam activity is discernable until the exterior portion of the granule has been dissolved away, exposing the interior of the granule loaded with agent. Delayed release of the laundry agent is thereby effected.

By altering the size of the grains of the particulate carrier and the amount of agent held by the carrier, the approximate time of release of the laundering agent can be adjusted.

It is projected that under actual laundering conditions the antifoam agent will begin to be released from the carrier toward the end of the wash (agitation) cycle. The partially hydrated granules of additive will cling to the articles being laundered and continue dissolving in the subsequent rinse cycle, thereby providing crucial antifoam activity in the rinse water.

The water soluble carrier of the invention is a modified cellulose material, comprising one or more members selected from the group consisting of substituted alkyl ethers of cellulose, unsubstituted alkyl ethers of cellulose, and salts of carboxyalkyl cellulose. The preferred substituted alkyl ethers of cellulose have alkyl groups in the range of 1 to 6 carbons, and in particular, methyl ethers of cellulose and ethyl ethers of cellulose and those having mixed substituents, such as hydroxypropyl methyl cellulose are highly preferred. Unsubstituted alkyl ethers of cellulose include hydroxypropyl ethers of cellulose. The carrier also includes salts of carboxyalkyl cellulose, such as alkaline metal salts of carboxyalkyl cellulose, preferably, sodium carboxymethyl cellulose.

The controlled release laundering additives of the invention may be made by a batch process or in a continuous stream process. An example of the invention made according to the batch process is set forth in the following example:

EXAMPLE 1

115 g of methyl cellulose ether carrier (90 g Methocel A4M, manufactured by Dow Chemical Co., Midland, Michigan, and 25 g carboxymethyl cellulose ether) in the form of a finely divided powder was placed in the mixing container of a Hobart mixer. 75 g of an antifoaming agent, of the general type described in U.S. Pat. No. 3,455,839, comprising 77.4 parts by weight polydimethylsiloxane having a viscosity of approximately 1000 cStokes, 9.0 parts by weight silicone resin composed of $(CH_3)_3SiO_{\frac{1}{2}}$ units and $SiO_2$ units in which the ratio of the $(CH_3)_3SiO_{\frac{1}{2}}$ units to the $SiO_2$ units is within the range of from 0.6:1 to 1.2:1, and silica aerogel, was slowly added to the carrier by dripping, while the carrier was mixed, thereby evenly distributing the agent throughout the carrier. On completing the addition of the antifoaming agent to the carrier, the carrier retained its fluffy, loose-powdery appearance and texture.

Agglomeration of the powdery carrier to a granular form was carried out by slowly dripping deionized water onto the antifoam adsorbed carrier while mixing with the Hobart mixer was continued. As water contacted and hydrated the surface of the powdery carrier particles, the particles became slightly sticky and began to agglomerate or clump together forming granules. When the granules reached a desirable size, that is, in the range of from 0.5 to 2.0 mm in diameter, they were placed in a drying oven until the water from the agglomeration step was driven off.

It is theorized by the inventor that the water added in the agglomeration step is responsible for concentrating the laundering agent in and around the center of the carrier particles. It is believed that the water used in the agglomeration step drives the laundering agent toward the center of the granular particle and leaves the outer portion of the particle hydrated, but relatively agent-free, thereby giving the particle its time-release properties.

Other methods of distributing the laundering agent evenly throughout the carrier are within the scope of this invention. These methods include spraying of the agent onto the carrier while the carrier is being mixed and also adsorbing the agent on the carrier by means of a fluidized bed system wherein the agent would be sprayed or dripped into a column of powdered carrier suspended and agitated by gas.

When an antifoam agent having a high viscosity is used dripping or spraying of the agent onto the carrier and otherwise evenly distributing the agent throughout the carrier may be difficult or even impossible. However, this situation can be easily remedied by diluting the high viscosity antifoam agent with a solvent to obtain a more manageable consistency. Care must be taken in choosing the solvent so that it is selective for the antifoam agent and will not dissolve the carrier, thereby causing premature agglomeration. Agglomeration at the agent adsorption stage of the process is believed to hinder the uniform distribution of the laundry agent throughout the carrier.

Typically, the solvent for an agent will be a non-polar, aliphatic solvent. Methylene chloride ($CH_2Cl_2$) or a paraffinic hydrocarbon solvent, such as Isopar E, commercially available from Exxon Co., U.S.A., Houston, Texas, can be used as solvents for the antifoaming agents of the invention.

Water is the preferred carrier solvent used in the agglomeration step. However, agglomeration of the carrier may alternatively be carried out using solvents other than water, suitable for the specific carrier, such as ethylene glycol ethylether, commercially available from Dow Chemical Co., Inc., Midland, Michigan, and sold under the trade name Dowanol EE, mixtures of glycerin and water, and mixtures of methylene chloride and lower alcohols, such as methanol, ethanol, isopropanol and normal propanol. The agglomeration and drying steps with nonaqueous solvents can be carried out in exactly the same manner as set forth in Example 1, although drying times when using solvents less volatile than water will naturally be longer.

The carriers of the invention can hold a wide weight range of antifoam agents and still remain effective. As a general rule, the weight proportion of agent to carrier will be determined primarily by the expense of the carrier and is not considered to be a critical technical aspect of this invention. However, it is preferred that the antifoam agent comprise from about 10 to 45 wt. % of the antifoam agent and carrier together. A more preferred weight range of the antifoam agent is from about 20 to 45 wt. % of the antifoam agent and carrier together. The most preferred weight range of the antifoam agent is from about 20 to 40 wt. % of the antifoam agent and carrier together. It is also possible to add amounts of dyes or coloring agents for the purpose of coloring the carrier. The dyes and coloring agents contemplated are those which would be those commonly known in the industry for coloring dry laundry detergents. The amount of dye or coloring agent incorporated in the invention is an amount sufficient to produce a color aesthetically pleasing to the formulator practicing the invention. Dyes and coloring agents can be added to the invention either during the antifoam agent loading step or during the agglomeration step.

When the antifoam additive is combined in admixture with a conventional dry laundry detergent the antifoam agent is required to be present in an amount in the range of from 0.1 to 2.0% antifoam agent per 100 parts by weight of dry laundry detergent. The preferred range of antifoam agent is from 0.5 to 1% antifoam agent per 100 parts by weight of dry laundry detergent.

Numerous examples of the invention were prepared according to the invention, the formulations of which are set forth in TABLE 1 below:

TABLE 1

| Sample | Anti-foam | (gm) | Carrier | gm | % Anti-foam | Solvent | Remarks |
|---|---|---|---|---|---|---|---|
| A | β | 30.0 | Methocel E50LV | 115 | 20.7 | IPA/MC | |
| B | β | 27.7 | Methocel E50LV | 92.3 | | | |
| | | | Methocel E4M | 20 | 19.8 | IPA/MC | Release time in shake test 18 min |
| C | α | 50 | CMC | 100 | 33.3 | IPA/MC | Appears to give instant release |
| D | α | 30 | Methocel E50LV | 100 | | | |
| | | | Methocel E4M | 20 | 20 | IPA/MC | Release time in shake test 15 min |
| E | α | 30 | Methocel E4M | 115 | 20.7 | IPA/MC | Release time in pump test 5 min |
| F | α | 45 | Methocel A4M | 115 | 28.1 | Isopar E | |
| G | α | 45 | Methocel A4M | 115 | 28.1 | Isopar E | Release time in pump test 10 min |
| H | α | 60 | Methocel A4M | 115 | 34.3 | Isopar E | |
| I | α | 60 | Methocel A4M | 115 | 34.3 | None | |
| J | α | 75 | Methocel A4M | 115 | 39.5 | None | Release time in pump test 2 min |
| K | α | 75 | Methocel A15C | 115 | 39.5 | None | |
| L | α | 115 | Methocel A4M | 115 | 50 | None | |
| M | α | 100 | Avicel | 250 | 28.6 | None | Did not granulate Properly |
| N | α | 75 | CMC | 25 | | | |
| | | | Methocel A4M | 90 | 39.5 | | |
| O | α | 49.1 | Methocel A4M | 146 | | | |
| | γ | 45 | | | 39.2 | Isopar C | |
| P | α | 94.1 | Methocel A4M | 115 | 45 | Isopar C | |
| Q | α | 1.2 | Methocel A4M | 115 | 1 | None | Did not granulate (formed dough) |
| R | α | 12.8 | Methocel A4M | 115 | 10 | Isopar C | Formed "flaky" granules |
| S | α | 20.3 | Methocel A4M | 115 | 15 | Isopar C | Formed "flaky" granules |

% Antifoam = refers to the antifoam content of the antifoam and carrier taken together
The Greek letter γ refers to an antifoam material according to Example 1 of U.S. Pat. No. 4,639,489.
The Greek letter β refers to an antifoam material comprising 88 wt. pts. of a polydimethylsiloxane having a viscosity of 1000 cStokes, 2.5 wt. pts. of a silicone resin and 10 wt. pts. silica aerogel.
MC = methylene chloride ($CH_2Cl_2$)
IPA = isopropol alcohol
Isopar C = a paraffinic hydrocarbon solvent commercially available from Exxon Co., U.S.A., Houston, Texas
CMC = carboxymethyl cellulose
Avicel = a microcrystalline cellulose material, commercially available from FMC Corp., Philadelphia, PA
shake test = a foam suppression test wherein a sample of the antifoam agent on the carrier is placed in a small bottle along with an amount of simulated laundry water, the sample is shaken until antifoam activity is observed Testing of embodiments of the invention was carried out to study the release and activity of the agent over a period of time in a simulated mechanical laundry system. The testing was conducted by means of an automated pump test apparatus of original design. The test apparatus comprised: a test tank (beaker) having a tall cylindrical shape for holding a quantity of simulated laundry water and column of detergent foam; an inlet tube for taking the simulated laundry water from the test tank; an air bleed valve for introducing a regulated amount of air into the inlet tube; a first pump (diaphragm type) for withdrawing laundry water from the test tank and for producing the initial foaming of the detergent by means of the air drawn into the stream and the agitation caused by the pump; a second pump (centrifugal type) for causing additional foaming and circulating the simulated laundry water back to the test tank via an outlet tube. The height of foam present in the beaker was detected by an ultrasonic device located at a predetermined distance above the surface of the laundry water and was computer recorded at 40 second intervals over the span of the test.

Tide brand non-phosphate laundry detergent, commercially available from Proctor & Gamble Corp., Cincinnati, Ohio, was used as the testing standard laundry detergent in all of the tests of the controlled release antifoam of the invention. A 3.2 g sample of the detergent and 1440 g of water were placed in the test tank of the pump test apparatus. The water used for the tests was deionized water but with 50 ppm $CaCl_2$ added to simulate a moderate level of water hardness. The temperature of the laundry water in the test runs was approximately 70° F. Except for test runs conducted for the purpose of determining foam production with no antifoam present (control runs) amounts of the tested antifoam and carrier combination were added to the laundry water in the test tank and the apparatus was switched on. The height of the foam in the test tank was detected by the ultrasonic device and the height of the foam was recorded in graph form at forty second intervals by computer. From the graphs an analysis was made as to the effectiveness of the time release capabilities of various embodiments of carrier and antifoam agent. Several of the test runs are reported in the graph FIG. 1 and are fully described below.

EXAMPLE 2

115.0 g of a loose, powdery carboxymethyl cellulose ether carrier, Dow Methocel A4M, was loaded into the mixing container of a Hobart mixer. 45.0 g of an antifoaming agent, designated antifoam alpha ($\alpha$), comprising 77.4 parts by weight polydimethyl siloxane having a viscosity of 1000 cStokes, 9.0 parts by weight silicone resin and 13.6 parts by weight silica aerogel were diluted with 90 g solvent known as Isopar E. The diluted antifoam agent was loaded on the carrier by dropwise addition while the carrier was subject to mixing. After the antifoam addition was completed, the carrier still maintained its loose powdery appearance. To agglomerate the carrier and provide for delayed release of the antifoam agent, 120 g of deionized water was added dropwise while being mixed. The granules were then transferred to a baking dish and dried for approximately one hour at 55° C.

100 g of the dried granules formed thereby were further agglomerated to form larger sized granules. The further agglomeration was accomplished by the slow, drop wise addition of 50 g of deionized water while the carrier and antifoam were mixed in the Hobart mixer. The granules, now ranging in size from approximately 0.5 to 2.0 mm in diameter, were then dried in the drying oven.

EXAMPLE 3

A second batch of delayed release antifoam material was prepared generally following the same procedure used in the preparation of EXAMPLE 1. However, for this example, 30 g of antifoam alpha were diluted with 60 g of a 50-50 mixture by weight of isopropol alcohol and methylene chloride. The diluted antifoam was then added to 115 g of loose, powdery Dow Methocel E4M, a premium grade hydroxypropyl methylcellulose ether, while subjected to mixing. After all of the diluted antifoam agent had been added, it was observed that numerous large lumps of carrier and antifoam, approximately 2 to 5 mm in diameter, were present in the mixing container. The lumps of carrier loaded with antifoam agent was placed in a Waring blender and the mixture chopped to achieve the desired powdery texture. The now powdery carrier loaded with antifoam agent was returned to the Hobart mixer and a total of 120 g of deionized water was slowly dripped in while the carrier was subjected to mixing. Granules formed in the agglomeration step were transferred to a glass baking dish and dried overnight at 55° C. The finished controlled release antifoam granules were approximately 0.5 to 2.0 mm in diameter.

COMPARATIVE EXAMPLE 1

A comparative example was prepared using for the carrier a sodium carboxymethyl substituted cellulose ether, the degree of carboxymethyl substitution being in the range of from 65–90%, the degree of polymerization being approximately 400 and the molecular weight being approximately 90,000, the carrier being commercially available from Hercules Incorporated, Wilmington, Delaware, under the trade name of CMC-7LT, and 45 g of antifoam alpha diluted with 90 g of a 50/50 weight mixture of isopropol alcohol and methylene chloride. The diluted antifoam agent was loaded on the carrier as in EXAMPLES 1 and 2. The resulting mixture had a fluffy, powdery texture. Unlike the previous examples, no water was added and no agglomeration of the mixture was carried out.

0.29 g samples of EXAMPLES 1 and 2 and COMPARATIVE EXAMPLE 1 were each tested individually in the pump tester with 3.2 g of Tide non-phosphate detergent and 1440 g of water, as described herein above, to determine foam formation and foam suppression over time. Additionally, a test run was conducted using only 3.2 g of Tide non-phosphate detergent in the water with no antifoaming agent present. The detergent only run was designated as the CONTROL test.

Graphs of the foam height in centimeters plotted at 40 second intervals for each of the above test runs were plotted by the computer of the pump tester apparatus and are presented in FIG. 1.

An examination of FIG. 1 shows that the CONTROL run produced a head of foam which steadily increased in height for approximately 700 seconds, approaching a height of approximately 21 cm above the surface of the simulated laundry water. 21 cm was the upper limit of foam height which could be measured with the device. On reaching this height, the pumps were switched off, but foam height measurements were continued for several more readings to determine the stability of the foam produced by the apparatus. As can be seen in the graph, only a slight decrease in foam height was detected within 160 seconds after shutting down the pumps, thereby indicating a very stable foam formation.

It is projected that with a test tank of sufficient height, a column of foam could be produced by the apparatus which would greatly exceed the 21 cm level. However, for the purposes of the experiments required herein, the time required for ascertainment of antifoam release and efficacy is well within the time which foam in a CONTROL test run would reach a height of 21 cm.

In FIG. 1, the graph of the test run for EXAMPLE 2 shows that foam production closely approximated that of CONTROL for the first 560 seconds of the run. This indicates that even though the antifoam was present in the laundry water it had not yet been released by the carrier. Deviation from the foam production curve of CONTROL began at about second 600. This deviation indicates initial release of the antifoam agent from the carrier. The suppression of new foam formation continues for several readings, then as more antifoam enters the system, knock down of extant foam occurs. Eventually, after about 1360 seconds, the antifoam looses its effectiveness and foam height increases anew.

The graph of the test run of EXAMPLE 3, wherein the carrier was a hydroxypropyl methylcellulose ether, shows that the initial foam production closely paralleled that of EXAMPLE 2 and CONTROL. However, release of the antifoam agent began at about second 360, earlier than antifoam release in EXAMPLE 2. It is believed that the earlier release of the antifoam from EXAMPLE 3 was due to higher solubility of the carrier in water than the carrier used in EXAMPLE 2. Higher solubility of the carrier translates into faster (earlier) release of the antifoam agent.

The testing of COMPARATIVE EXAMPLE 1 resulted in a curve showing that foam production lagged behind that of CONTROL from nearly the beginning of the run. The suppression of foam production from almost the onset of the test is an indication that the unagglomerated carrier did not delay the release of the antifoam agent.

What is claimed is:

1. A delayed release antifoam laundry additive consisting essentially of one or more conventional silicon based antifoam agents held on a carrier comprising water soluble modified cellulose, wherein said antifoam agent is contained in said laundry additive in an amount of from about 10 to 45' wt. % based on the weight of said antifoam agent and said carrier taken together, said delayed release antifoam laundry additive being formed by the process comprising the steps of:

(i) first uniformly loading said antifoam agent on said carrier;

(ii) then mixing said carrier in the presence of an amount of a solvent for said carrier sufficient to cause agglomeration of said carrier: and (iii) then driving the solvent from the carrier.

2. A delayed release antifoam laundry additive as claimed in claim 1, in admixture with a conventional dry laundry detergent, wherein said antifoam agent is present in an amount of from 0.1 to 2.0% per 100 parts by weight of said conventional dry laundry detergent.

3. A delayed release antifoam laundry additive as claimed in claim 1, in admixture with a conventional dry laundry detergent, wherein said antifoam agent is present in an amount of from 0.5 to 1.0% per 100 parts by weight of said conventional dry laundry detergent.

4. A delayed release antifoam laundry additive as claimed in claim 1, wherein said antifoam agent is a conventional silicone-filled polydimethyl siloxane antifoam agent and is contained in said laundry additive in an amount of from about 10 to 45 wt. % based on the weight of said antifoam agent and said carrier taken together, said carrier being selected from the group consisting of substituted alkyl ethers of cellulose, unsubstituted alkyl ethers of cellulose and salts of carboxyalkyl cellulose.

5. A delayed release antifoam laundry additive as claimed in claim 4, in admixture with a conventional dry laundry detergent, wherein said antifoam agent is present in an amount of from 0.1 to 2.0% per 100 parts by weight of said conventional dry laundry detergent.

6. A delayed release antifoam laundry additive, as claimed in claim 4, wherein said additive has a granular form with particles ranging from 0.5 to 2.0 mm in diameter.

7. A delayed release antifoam laundry additive as claimed in claim 4, wherein said antifoam agent is further defined as being contained in said laundry additive in an amount of from 20 to 45 wt. % based on the weight of said antifoam agent and said carrier taken together.

8. A delayed release antifoam laundry additive as claimed in claim 7, in admixture with a conventional dry laundry detergent, wherein said antifoam agent is present in an amount of from 0.1 to 2.0% per 100 parts by weight of said conventional dry laundry detergent.

9. A delayed release antifoam laundry additive, as claimed in claim 7, wherein said additive has a granular form with particles ranging from 0.5 to 2.0 mm in diameter.

10. A delayed release antifoam laundry additive as claimed in claim 7, wherein said antifoam agent is further defined as being contained in said laundry additive in an amount of from 20 to 40 wt. % based on the weight of said antifoam agent and said carrier taken together.

11. A delayed release antifoam laundry additive as claimed in claim 7, wherein said carrier is further defined in that the alkyl groups of said substituted and unsubstituted alkyl ethers of cellulose and carboxyalkyl cellulose have from 1 to 6 carbons, and said salts of carboxyalkyl cellulose are alkaline metal salts.

12. A delayed release antifoam laundry additive as claimed in claim 11, wherein said carrier is selected from the group consisting of methyl ethers of cellulose, ethyl ethers of cellulose, hydroxypropyl ethers of cellulose and sodium carboxymethyl cellulose.

13. An agglomerated delayed release antifoam laundry additive, consisting essentially of one or more conventional silicon based antifoam agents loaded on a carrier comprising water soluble modified cellulose, wherein said antifoam agent is contained in said laundry additive in an amount of from about 10 to 45 wt. % based on the weight of said antifoam agent and said carrier taken together, said carrier being agglomerated with a solvent for the carrier subsequent to loading of said antifoam agent onto said carrier.

14. An agglomerated delayed release antifoam laundry additive, as claimed in claim 13, in admixture with a conventional dry laundry detergent, wherein said antifoam agent is present in an amount of from 0.1 to 2.0% per 100 parts by weight of said conventional dry laundry detergent.

15. A delayed release antifoam laundry additive as claimed in claim 13, in admixture with a conventional dry laundry detergent, wherein said antifoam agent is present in an amount of from 0.5 to 1.0% per 100 parts by weight of said conventional dry laundry detergent.

16. An agglomerated delayed release antifoam laundry additive, as claimed in claim 13, wherein said antifoam agent is a conventional silica-filled polydimethyl siloxane antifoam agent and is contained in said laundry additive in an amount of from about 10 to 45 wt. % based on the weight of said antifoam agent and said carrier taken together, said carrier being selected from the group consisting of substituted alkyl ethers of cellulose, unsubstituted alkyl ethers of cellulose and salts of carboxyalkyl cellulose.

17. An agglomerated delayed release antifoam laundry additive, as claimed in claim 16, in admixture with a conventional dry laundry detergent, wherein said antifoam agent is present in an amount of from 0.1 to 2.0% per 100 parts by weight of said conventional dry laundry detergent.

18. A delayed release antifoam laundry additive, as claimed in claim 16, wherein said additive has a granular form with particles ranging from 0.5 to 2.0 mm in diameter.

19. An agglomerated delayed release antifoam laundry additive, as claimed in claim 16, wherein said antifoam agent is further defined as being contained in said laundry additive in an amount of from 20 to 40 wt. % based on the weight of said antifoam agent and said carrier taken together.

20. An agglomerated delayed release antifoam laundry additive, as claimed in claim 16, wherein said antifoam agent is further defined as being contained in said laundry additive in an amount of from 20 to 45 wt. % based on the weight of said antifoam agent and said carrier taken together.

21. An agglomerated delayed release antifoam laundry additive, as claimed in claim 20, in admixture with a conventional dry laundry detergent, wherein said antifoam agent is present in an amount of from 0.1 to 2.0% per 100 parts by weight of said conventional dry laundry detergent.

22. A delayed release antifoam laundry additive, as claimed in claim 20, wherein said additive has a granular form with particles ranging from 0.5 to 2.0 mm in diameter.

23. A delayed release antifoam laundry additive as claimed in claim 22, in admixture with a conventional dry laundry detergent, wherein said antifoam agent is present in an amount of from 0.1 to 2.0% per 100 parts by weight of said conventional dry laundry detergent.

24. An agglomerated delayed release antifoam laundry additive, as claimed in claim 20, wherein said carrier is further defined in that the alkyl groups of said substituted and unsubstituted alkyl ethers of cellulose and carboxyalkyl cellulose have from 1 to 6 carbons, and said salts of carboxyalkyl cellulose are alkaline metal salts.

25. An agglomerated delayed release antifoam laundry additive, as claimed in claim 24, wherein said carrier is selected from the group consisting of methyl ethers of cellulose, ethyl ethers of cellulose, hydroxypropyl ethers of cellulose and sodium carboxymethyl cellulose.

26. A delayed release antifoam laundry additive consisting of one or more conventional silicon based antifoam agents held on a carrier comprising water soluble modified cellulose, wherein said antifoam agent is contained in said laundry additive in an amount of from about 10 to 45 wt. % based on the weight of said antifoam agent and said carrier taken together, said delayed release antifoam laundry additive being formed by the process comprising the steps of:

(i) first uniformly loading said antifoam agent on said carrier;

(ii) then mixing said carrier in the presence of an amount of a solvent for said carrier sufficient to cause agglomeration of said carrier; and (iii) then driving the solvent from the carrier.

27. A delayed release antifoam laundry additive as claimed in claim 26, in admixture with a conventional dry laundry detergent, wherein said antifoam agent is present in an amount of from 0.5 to 1.0% per 100 parts by weight of said conventional dry laundry detergent.

28. A delayed release antifoam laundry additive as claimed in claim 26, wherein said antifoam agent is a conventional silicone-filled polydimethyl siloxane antifoam agent and is contained in said laundry additive in an amount of from about 10 to 45 wt. % based on the weight of said antifoam agent and said carrier taken together, said carrier being selected from the group consisting of substituted alkyl ethers of cellulose, unsubstituted alkyl ethers of cellulose and salts of carboxyalkyl cellulose.

29. A delayed release antifoam laundry additive, as claimed in claim 28, wherein said additive has a granular form with particles ranging from 0.5 to 2.0 mm in diameter.

30. A delayed release antifoam laundry additive as claimed in claim 28, wherein said antifoam agent is further defined as being contained in said laundry additive in an amount of from 20 to 45 wt. % based on the weight of said antifoam agent and said carrier taken together.

31. A delayed release antifoam laundry additive, as claimed in claim 30, wherein said additive has a granular form with particles ranging from 0.5 to 2.0 mm in diameter.

32. A delayed release antifoam laundry additive as claimed in claim 30, wherein said antifoam agent is further defined as being contained in said laundry additive in an amount of from 20 to 40 wt. % based on the weight of said antifoam agent and said carrier taken together.

33. A delayed release antifoam laundry additive as claimed in claim 32, in admixture with a conventional dry laundry detergent, wherein said antifoam agent is present in an amount of from 0.1 to 2.0% per 100 parts by weight of said conventional dry laundry detergent.

34. A delayed release antifoam laundry additive as claimed in claim 30, wherein said carrier is further defined in that the alkyl groups of said substituted and unsubstituted alkyl ethers of cellulose and carboxyalkyl cellulose have from 1 to 6 carbons, and said salts of carboxyalkyl cellulose are alkaline metal salts.

35. A delayed release antifoam laundry additive as claimed in claim 34, wherein said carrier is selected from the group consisting of methyl ethers of cellulose, ethyl ethers of cellulose, hydroxypropyl ethers of cellulose and sodium carboxymethyl cellulose.

36. A delayed release antifoam laundry additive consisting of one or more conventional silicon based antifoam agents held on a carrier comprising water soluble modified cellulose, wherein said antifoam agent is contained in said laundry additive in an amount of from about 10 to 45 wt. % based on the weight of said antifoam agent and said carrier taken together, said delayed release antifoam laundry additive being formed by the process comprising the steps of:

(i) first uniformly loading said antifoam agent on said carrier;

(ii) then mixing said carrier in the presence of an amount of a solvent for said carrier sufficient to cause agglomeration of said carrier; and (iii) then driving the solvent from the carrier; and said delayed release antifoam laundry additive is in admixture with a conventional dry laundry detergent, wherein said antifoam agent is present in an amount of from 0.1 to 2.0% per 100 parts by weight of said conventional dry laundry detergent.

37. A delayed release antifoam laundry additive consisting of one or more conventional silicon based antifoam agents held on a carrier comprising water soluble modified cellulose, wherein said antifoam agent is contained in said laundry additive in an amount of from about 10 to 45 wt. % based on the weight of said antifoam agent and said carrier taken together, said delayed release antifoam laundry additive being formed by the process comprising the steps of:

(i) first uniformly loading said antifoam agent on said carrier;

(ii) then mixing said carrier in the presence of an amount of a solvent for said carrier sufficient to cause agglomeration of said carrier; and (iii) then driving the solvent from the carrier; and said delayed release antifoam laundry additive is in admixture with a conventional dry laundry detergent, wherein said antifoam agent is present in an amount of from 0.1 to 2.0% per 100 parts by weight of said conventional dry laundry detergent.

38. A delayed release antifoam laundry additive consisting of one or more conventional silicon based antifoam agents held on a carrier comprising water soluble modified cellulose, wherein said antifoam agent is contained in said laundry additive in an amount of from about 10 to 45 wt. % based on the weight of said antifoam agent and said carrier taken together, said delayed release antifoam laundry additive being formed by the process comprising the steps of:

(i) first uniformly loading said antifoam agent on said carrier;

(ii) then mixing said carrier in the presence of an amount of a solvent for said carrier sufficient to cause agglomeration of said carrier; and (iii) then driving the solvent from the carrier; and said delayed release antifoam laundry additive is in admixture with a conventional dry laundry detergent, wherein said antifoam agent is present in an amount of from 0.1 to 2.0% per 100 parts by weight of said conventional dry laundry detergent.

39. An agglomerated delayed release antifoam laundry additive, consisting of one or more conventional silicon based antifoam agents loaded on a carrier comprising water soluble modified cellulose, said carrier being agglomerated with a solvent for the carrier subsequent to loading of said antifoam agent onto said carrier, wherein said antifoam agent is contained in said laundry additive in an amount of from about 10 to 45 wt. % based on the weight of said antifoam agent and said carrier taken together in admixture with a conventional dry laundry detergent, wherein said antifoam agent is present in an amount of from 0.1 to 2.0% per 100 parts by weight of said conventional dry laundry detergent.

40. An agglomerated delayed release antifoam laundry additive, consisting of one or more conventional silicon based antifoam agents loaded on a carrier comprising water soluble modified cellulose, said carrier being agglomerated with a solvent for the carrier subsequent to loading of said antifoam agent onto said carrier, wherein said antifoam agent is contained in said laundry additive in an amount of from about 10 to 45 wt. % based on the weight of said antifoam agent and said carrier taken together.

41. A delayed release antifoam laundry additive as claimed in claim 40, in admixture with a conventional dry laundry detergent, wherein said antifoam agent is present in an amount of from 0.5 to 1.0% per 100 parts by weight of said conventional dry laundry detergent.

42. An agglomerated delayed release antifoam laundry additive, as claimed in claim 40, wherein said antifoam agent is a conventional silica-filled polydimethyl siloxane antifoam agent and is contained in said laundry additive in an amount of from about 10 to 45 wt. % based on the weight of said antifoam agent and said carrier taken together, said carrier being selected from the group consisting of substituted alkyl ethers of cellulose, unsubstituted alkyl ethers of cellulose and salts of carboxyalkyl cellulose.

43. A delayed release antifoam laundry additive, as claimed in claim 42, wherein said additive has a granular form with particles ranging from 0.5 to 2.0 mm in diameter.

44. An agglomerated delayed release antifoam laundry additive, as claimed in claim 42, wherein said antifoam agent is further defined as being contained in said laundry additive in an amount of from 20 to 40 wt. % based on the weight of said antifoam agent and said carrier taken together.

45. An agglomerated delayed release antifoam laundry additive, as claimed in claim 42, wherein said carrier is selected from the group consisting of substituted alkyl ethers of cellulose, unsubstituted alkyl ethers of cellulose and salts of carboxyalkyl cellulose.

46. An agglomerated delayed release antifoam laundry additive, as claimed in claim 45, in admixture with a conventional dry laundry detergent, wherein said antifoam agent is present in an amount of from 0.1 to 2.0% per 100 parts by weight of said conventional dry laundry detergent.

47. An agglomerated delayed release antifoam laundry additive, as claimed in claim 42, wherein said antifoam agent is further defined as being contained in said laundry additive in an amount of from 20 to 45 wt. % based on the weight of said antifoam agent and said carrier taken together.

48. A delayed release antifoam laundry additive, as claimed in claim 47, wherein said additive has a granular form with particles ranging from 0.5 to 2.0 mm in diameter.

49. An agglomerated delayed release antifoam laundry additive, as claimed in claim 47, wherein said carrier is further defined in that the alkyl groups of said substituted and unsubstituted alkyl ethers of cellulose and carboxyalkyl cellulose have from 1 to 6 carbons, and said salts of carboxyalkyl cellulose are alkaline metal salts.

50. An agglomerated delayed release antifoam laundry additive, as claimed in claim 49, wherein said carrier is selected from the group consisting of methyl ethers of cellulose, ethyl ethers of cellulose, hydroxypropyl ethers of cellulose and sodium carboxymethyl cellulose.

51. A method of forming agglomerated granules for the delayed release of antifoam agent in water which comprises loading one or more conventional silicon based antifoam agents on a carrier of water soluble modified cellulose, wherein said antifoam agent is contained in said laundry additive in an amount of from about 10 to 45 wt. % based on the weight of said antifoam agent and said carrier taken together then mixing the carrier loaded with antifoam agent in the presence of a solvent for the carrier in an amount sufficient to agglomerate said carrier.

52. A method as claimed in claim 51, wherein said method further comprises driving said solvent for the carrier from said carrier subsequent to agglomerating said carrier.

* * * * *